United States Patent Office 3,701,688
Patented Oct. 31, 1972

3,701,688
NON-AQUEOUS ELECTROLYTE FOR LITHIUM ELECTROCHEMICAL GENERATORS
Jean-Paul Gabano, Poitiers, and Gerard Marcel Gerbier, Biard, France, assignors to Societe des Accumulateurs Fixes et de Traction (Societe Anonyme), Pont de la Folie, Romainville, France
No Drawing. Filed July 27, 1970, Ser. No. 58,726
Int. Cl. H01m 11/00
U.S. Cl. 136—100 R          6 Claims

ABSTRACT OF THE DISCLOSURE

Electrochemical generators utilizing lithium negative electrodes and a solution of lithium perchlorate solute in organic solvent such as tetrahydrofuran together with an additional organic solvent selected from the group consisting of methyltetrahydrofuran, tetrahydropyran, isopropylamine, diethylamine, methylpyrrolidone and methylmorpholine. The range of tetrahydrofuran by weight is from about 70 to about 75% and the additional organic solvent ranges by weight from about 10 to 19% while the lithium perchlorate solute ranges by weight from 11 to 15%. The positive electrodes are preferably of copper sulfide and separators between the electrodes are, for example, of cellulose or polytetrafluoroethylene felted fabric.

RELATED APPLICATIONS

A related application Ser. No. 718,974, filed Mar. 21, 1968 and now U.S. Pat. No. 3,511,716 is owned by the assignee of the present application.

A further related application Ser. No. 693,320 (now U.S. Pat. 3,542,602) is co-pending.

BRIEF SUMMARY OF INVENTION

U.S. Pat. 3,511,716, dated May 12, 1970, describes a non-aqueous electrolyte having high solvating powers, which can be used in electrochemical generators with a lithium negative electrode, said electrolyte being of the type formed by a solution of lithium perchlorate solute in tetrahydrofuran, and comprising, moreover, at least one additional organic solvent therein intended to increase the solubility of the lithium perchlorate in the said electrolyte. In said patent, this additional organic solvent is 1-1-dimethoxyethane or 1-2-dimethoxyethane.

The presence of such said additional organic solvent has the effect of decreasing the polarization of the negative electrodes, due to the increase in the solubility of the lithium ion. This results in an increase in the value of limiting current without polarization.

This possibility of increasing the quantity of lithium ions dissolved being related to the increase in the solubility of the lithium perchlorate, there results a correlative increase in the conductivity of the electrolyte.

The electrochemical generator utilizing such electrolyte therefore operates at a higher voltage than a generator of the same type whose electrolyte does not comprise the said additional organic solvent, not only because the anode becomes less polarizable but also because the internal resistance is lower.

In the said patent it has been disclosed that the said additional organic solvent should consist of 1-1-dimethoxyethane or 1-2-dimethoxyethane.

The applicants have continued their researches on non-aqueous electrolytes to determine whether other added organic solvents exist which could, to greater advantage, be used as additional organic solvents, for use in connection with tetrahydrofuran and lithium perchlorate solute to increase solubility of the latter in the electrolyte. This constitutes a principal object of the present invention.

Other objects and features of the invention will become apparent from the following detailed description.

DETAILED DESCRIPTION

According to the present invention, it has been found that the said extra or additional organic solvent to be added to tetrahydrofuran to increase the solubility of the lithium perchlorate in the electrolyte can be selected from the group consisting of methyltetrahydrofuran, tetrahydropyran, isopropylamine, diethylamine, methylpyrrolidone and methylmorpholine, together, of course, with the lithium perchlorate solute.

The percentage, by volume of the said additional organic solvent in the electrolyte can be in the order of 20% and the volume of the lithium perchlorate being of the order of about 12% and the balance tetrahydrofuran.

EXAMPLE I

A primary electrochemical generator such as shown in FIG. 5 of said patent comprising five positive electrodes of copper sulfide each 50 x 50 x 1.5 mm., six negative electrodes of lithium each 50 x 50 x 1.8 mm. with interposed separators of cellulose or polytetrafluoroethylene felted fabric about 0.3 mm. thick are assembled in an appropriate container with requisite electrical connections from the electrodes to terminals for connection in turn to discharge through a 10 ohm resistor.

A non-aqueous electrolyte consisting by weight of the following components is added to the assembled electrodes in the container.

Tetrahydrofuran 70% as primary organic solvent;
Lithium perchlorate 12% as solute;
Methyltetrahydrofuran 18% as second added organic solvent.

The conductivity ($10^3 \Omega^{-1} \text{cm.}^{-1}$) of this electrolyte is 4.1.

This cell discharged through the 10 ohm resistor provides an average voltage of 1.30 volts and an energy to weight ratio (wh./kg.) of 180.

EXAMPLE II

A like electrochemical generator was tested utilizing a different non-aqueous electrolyte consisting by weight of the following components:

Tetrahydrofuran 75% as primary organic solvent;
Lithium perchlorate 15% as solute;
Isopropylamine 10% as second added organic solvent.

The conductivity ($10^3 \Omega^{-1} \text{cm.}^{-1}$) of this electrolyte is 5.3.

The average discharge voltage is 1.5 and an energy to weight ratio (wh./kg.) is 190.

EXAMPLE III

Substituting and testing in a like electrochemical generator of a non-aqueous electrolyte consisting by weight of Tetrahydrofuran 66% as primary organic solvent;
Lithium perchlorate 15% as solute;
Isopropylamine 19% as second added organic solvent;
The conductivity ($10^3 \Omega^{-1} \text{cm.}^{-1}$) is 5.7, the average voltage is 1.53 and the energy weight ratio (wh./kg.) is 180.

EXAMPLE IV

Substituting and testing in a like electrochemical generator of a non-aqueous electrolyte consisting by weight of:

Tetrahydrofuran 70% as a primary organic solvent;
Lithium perchlorate 12% as solute;
Diethylamine 18% as secondary added organic solvent;
The conductivity ($10^3 \Omega^{-1} \text{cm.}^{-1}$) is 3.3, the average voltage 1.50 and the energy to weight ratio (wh./kg.) is 195.

EXAMPLE V

Substituting and testing in a like electrochemical generator of a non-aqueous electrolyte consisting by weight of:

Tetrahydrofuran 70% as primary organic solvent;
Lithium perchlorate 12% as solute;
Methyl pyrrolidone 18% as secondary added organic solvent;

The conductivity ($3\Omega^{-1}cm.^{-1}$) is 8.0, the average voltage is 1.34 and the energy to weight ratio (wh./kg.) is 1.70.

EXAMPLE VI

Substituting and testing in a like electrochemical generator of a non-aqueous electrolyte consisting by weight of:

Tetrahydrofuran 75% as primary organic solvent;
Lithium perchlorate 12% as solute;
Methylmorpholine 18% as secondary added organic solvent;

The conductivity ($10^3\Omega^{-1}cm.^{-1}$) is 2.18, the average voltage 1.49 and the energy to weight ratio (wh./kg.) is 1.61.

These electrolytes of Examples I–VI also have given good results at rapid discharge rates.

In tabular form the results of Examples I–VI are as follows:

The foregoing examples show high conductivity, high discharge voltage and high energy to weight ratios and provide highly satisfactory electrochemical generators capable and in most cases superior to those with the electrolytes of said earlier Pat. No. 3,511,716.

While specific embodiments of the invention have been disclosed, variations in the percentages of the compounds used in the non-aqueous electrolyte and their nature within the scope of the appended claims are possible and are contemplated. There is no intention, therefore, of limitation to the exact disclosure and abstract herein presented.

What is claimed is:

1. An electrochemical generator containing a lithium negative electrode and a positive copper sulfide electrode and a non-aqueous electrolyte solution having high solvating power, said electrolyte consisting of lithium perchlorate in tetrahydrofuran organic solvent and a second organic solvent to increase the solubility of the lithium perchlorate in the electrolyte, said second organic solvent being selected from the group consisting of methyltetrahydrofuran, tetrahydropyran, isopropylamine, diethylamine, methylpyrrolidone and methylmorpholine.

2. An electrochemical generator according to claim 1, wherein the percentage by volume of said second organic solvent is about 20% and the percentage by volume of said lithium perchlorate is about 12%.

TABLE I

| | Percent tetrahydrofuran | Organic solvent | Percent | Percent LiClO$_4$ | Conductivity ($10^3\Omega^{-1}$ cm.$^{-1}$) | Average voltage | Energy to weight ratio (wh./kg.) |
|---|---|---|---|---|---|---|---|
| Ex. I | 70 | Methyltetrahydrofuran | 18 | 12 | 4.1 | 1.30 | 180 |
| Ex. II | 75 | Isopropylamine | 10 | 15 | 5.3 | 1.50 | 190 |
| Ex. III | 66 | do | 19 | 15 | 5.7 | 1.53 | 180 |
| Ex. IV | 70 | Diethylamine | 18 | 12 | 3.3 | 1.50 | 195 |
| Ex. V | 70 | Methylpyrrolidone | 18 | 12 | 8.0 | 1.34 | 170 |
| Ex. VI | 75 | Methylmorpholine | 18 | 12 | 2.8 | 1.49 | 161 |

EXAMPLE VII

In a like electrochemical generator such as those used in Examples I to VI, a non-aqueous electrolyte consisting by weight of:

Tetrahydrofuran 70% as primary organic solvent;
Lithium perchlorate 12% as solute;
Tetrahydropyran 18% as second added organic solvent; discharged through a 3 ohm resistor;

The conductivity ($10^3\Omega^{-1}cm.^{-1}$) was 3.5, the average voltage 1.27 and the energy to weight ratio (wh./kg.) was 1.30.

EXAMPLE VIII

By way of comparison, in a like electrochemical generator such as those of Examples I to VII, a non-aqueous electrolyte consisting by weight of:

Tetrahydrofuran 70% as primary organic solvent;
Lithium perchlorate 11% as solute.
1,2-dimethoxyethane 27% as second added organic solvent;

Also discharged through a 3 ohm resistor, the conductivity ($10^3\Omega^{-1}cm.^{-1}$) was 4, the average voltage 1.42 and the energy to weight ratio (wh./kg.) was 180.

In tabular form the results of Examples VII and VIII are as follows:

3. An electrochemical generator according to claim 1, wherein the percentage by weight of lithium perchlorate ranges from about 12 to 15%, the percentage by weight of tetrahydrofuran ranges from about 66 to 75% and the percentage by weight of said second organic solvent ranges from about 10 to 19%.

4. A non-aqueous electrolyte for use in an electrochemical generator containing a lithium negative electrode consisting of lithium perchlorate solute dissolved in tetrahydrofuran organic solvent and at least one second organic solvent to increase the solubility of lithium perchlorate in said electrolyte, said second organic solvent being selected from the group consisting of methyltetrahydrofuran, tetrahydropyran, isopropylamine, diethylamine, methylpyrrolidone and methylmorpholine.

5. A non-aqueous electrolyte according to claim 4, wherein the percentage by volume of the second organic solvent in the electrolyte is about 20% and the percentage by volume of the lithium perchlorate is about 12%.

6. A non-aqueous electrolyte according to claim 4, wherein the percentages by weight of lithium perchlorate solute ranges from about 12 to 15%, the percentage by weight of tetrahydrofuran ranges from about 66 to 75%,

TABLE II

| | Percent tetrahydrofuran | Organic solvent | Percent | Percent LiClO$_4$ | Conductivity ($10^3\Omega^{-1}$ cm.$^{-1}$) | Average voltage | Energy to weight ratio (wh./kg.) |
|---|---|---|---|---|---|---|---|
| Ex. VII | 70 | Tetrahydropyran | 18 | 12 | 3.5 | 1.27 | 130 |
| Ex. VIII | 62 | 1-2 dimethoxyethane | 27 | 11 | 4.0 | 1.42 | 180 | and the percentage by weight of said second organic solvent ranges from about 10 to 19%.

References Cited

UNITED STATES PATENTS

| 3,511,716 | 5/1970 | Gabano et al. | 136—155 |
| 3,468,716 | 9/1969 | Eisenberg | 136—155 |
| 3,423,242 | 1/1969 | Meyers et al. | 136—154 |
| 3,532,543 | 10/1970 | Nole et al. | 136—154 |

FOREIGN PATENTS

| 1,527,783 | 6/1968 | France | 136—154 |
| 1,490,726 | 8/1967 | France | 136—154 |

DONALD L. WALTON, Primary Examiner

U.S. Cl. X.R.

136—155